United States Patent
Morey et al.

(10) Patent No.: US 9,989,970 B1
(45) Date of Patent: Jun. 5, 2018

(54) SYSTEMS AND METHODS FOR ROBOTS HAVING AN ADJUSTABLE MULTI-WHEEL

(71) Applicant: X Development LLC, Mountain View, CA (US)

(72) Inventors: Christopher Morey, Oakland, CA (US); Adam Horton, Oakland, CA (US); David Youmans, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 167 days.

(21) Appl. No.: 15/226,997

(22) Filed: Aug. 3, 2016

(51) Int. Cl.
| | |
|---|---|
| *G05D 1/02* | (2006.01) |
| *B25J 9/16* | (2006.01) |
| *B25J 5/00* | (2006.01) |
| *B62D 57/02* | (2006.01) |
| *B60B 19/04* | (2006.01) |
| *A61G 5/06* | (2006.01) |

(52) U.S. Cl.
CPC ............ *G05D 1/0246* (2013.01); *B25J 5/007* (2013.01); *B25J 9/1697* (2013.01); *B62D 57/022* (2013.01); *Y10S 901/01* (2013.01)

(58) Field of Classification Search
CPC ....... G05D 1/0246; B25J 5/007; B25J 9/1697; B62D 57/022; Y10S 901/01; B60B 19/04; A61G 5/061
See application file for complete search history.

(56) References Cited

U.S. PATENT DOCUMENTS

| | | | | |
|---|---|---|---|---|
| 5,492,390 | A * | 2/1996 | Kugelmann, Sr. | ...... B60B 19/00 301/5.1 |
| 5,690,375 | A * | 11/1997 | Schneider | ................. B60B 9/24 295/33 |
| 5,701,965 | A | 12/1997 | Kamen et al. | |
| 6,144,180 | A * | 11/2000 | Chen | .................... B62D 57/028 318/568.1 |
| 7,334,850 | B2 * | 2/2008 | Spector | ................... A61G 5/061 305/158 |
| 7,380,618 | B2 * | 6/2008 | Gunderson | ........ B62D 49/0635 180/7.1 |
| 7,503,567 | B2 * | 3/2009 | Frankie | ..................... A61G 5/04 180/8.2 |

(Continued)

*Primary Examiner* — Krishnan Ramesh
(74) *Attorney, Agent, or Firm* — McDonnell Boehnen Hulbert & Berghoff LLP

(57) ABSTRACT

Robotic vehicles and methods described herein relate to robot navigation, physical configuration, and obstacle avoidance. An example robotic vehicle includes a chassis and a sensor coupled to the chassis. Furthermore, the robotic vehicle includes a plurality of multi-wheels coupled to the chassis. As such, each multi-wheel is configured to rotate about a primary axis of rotation. Each multi-wheel includes a plurality of rotatable wheel elements and each rotatable wheel element is configured to rotate about a respective secondary axis of rotation. The robotic vehicle includes an actuator configured to extend or retract at least one rotatable wheel element such that a position of at least one rotatable wheel element is adjustable relative to the primary axis of rotation. Yet further, the robotic vehicle includes a motor configured to drive the rotatable wheel elements about their respective secondary axes of rotation and drive the respective multi-wheels about their primary axes.

20 Claims, 15 Drawing Sheets

(56) References Cited

U.S. PATENT DOCUMENTS

| | | | |
|---|---|---|---|
| 9,878,576 B2* | 1/2018 | Hein | B60B 19/04 |
| 2005/0127752 A1* | 6/2005 | Spector | A61G 5/061 |
| | | | 305/126 |
| 2006/0185911 A1* | 8/2006 | Gunderson | B62D 49/0635 |
| | | | 180/8.3 |
| 2007/0193790 A1* | 8/2007 | Goldenberg | B62D 55/075 |
| | | | 180/9.1 |
| 2008/0251300 A1* | 10/2008 | Frankie | A61G 5/04 |
| | | | 180/8.2 |
| 2013/0081885 A1* | 4/2013 | Connor | A61G 5/06 |
| | | | 180/8.2 |
| 2013/0231814 A1 | 9/2013 | Sarokhan et al. | |
| 2014/0265536 A1* | 9/2014 | Hein | B60B 19/04 |
| | | | 301/91 |

* cited by examiner

Side View

Side View

Side View

Side View

Side View

Side View

Side View

SYSTEMS AND METHODS FOR ROBOTS HAVING AN ADJUSTABLE MULTI-WHEEL

BACKGROUND

Robots may be utilized in applications such as manufacturing, inventory management, and household help. In some cases, robots may need to avoid or otherwise circumvent obstacles along a desired movement path. Furthermore, some robots have an adjustable physical configuration.

SUMMARY

Implementations in the present disclosure relate to systems and methods for reconfiguring a physical shape or arrangement of a robotic vehicle. Specifically, a multi-wheeled robot may include two or more multi-wheels, each having several rotatable wheel elements. In an example embodiment, a position of at least one rotatable wheel element may be adjusted so as to change the physical configuration of the robotic vehicle. In such a scenario, reconfiguring the multi-wheel(s) of the robotic vehicle may provide a better (e.g., more efficient) way to avoid certain obstacles. For example, reconfiguring the physical shape of the multi-wheel may provide better stair-climbing ability for a robot. Furthermore, changing the shape of the multi-wheel may provide different robotic poses, which may provide a more adjustable platform for interacting with, navigating through, and/or viewing the environment.

In an aspect, a robotic vehicle is provided. The robotic vehicle includes a chassis and a sensor coupled to the chassis. The robotic vehicle also includes a plurality of multi-wheels coupled to the chassis. Each multi-wheel is configured to rotate about a primary axis of rotation and each multi-wheel includes a plurality of rotatable wheel elements. Each rotatable wheel element is configured to rotate about a respective secondary axis of rotation. The robotic vehicle also includes at least one actuator configured to extend or retract at least one rotatable wheel element such that a position of at least one rotatable wheel element is adjustable relative to the primary axis of rotation. The robotic vehicle yet further includes at least one motor coupled to the chassis and configured to drive the rotatable wheel elements about their respective secondary axes of rotation. The robotic vehicle also includes at least one further motor coupled to at least one multi-wheel of the plurality of multi-wheels. The at least one further motor is configured to drive the at least one multi-wheel about the primary axis.

In an aspect, a robotic vehicle is provided. The robotic vehicle includes a chassis, a sensor coupled to the chassis, and a plurality of multi-wheels coupled to the chassis. Each multi-wheel is configured to rotate about a primary axis of rotation and each multi-wheel includes a plurality of rotatable wheel elements. Each rotatable wheel element is configured to rotate about a respective secondary axis of rotation. The robotic vehicle includes at least one actuator configured to extend or retract at least one rotatable wheel element such that a position of at least one rotatable wheel element is adjustable relative to the primary axis of rotation. Yet further, the robotic vehicle includes at least one motor coupled to the chassis and configured to drive the rotatable wheel elements about their respective secondary axes of rotation. The robotic vehicle additionally includes at least one further motor coupled to at least one multi-wheel of the plurality of multi-wheels. The at least one further motor is configured to drive the at least one multi-wheel about the primary axis. The robotic vehicle also includes a plurality of further multi-wheels arranged along a further axis of rotation. The plurality of further multi-wheels is configured to rotate freely about the further axis of rotation. Each further multi-wheel includes a respective plurality of further rotatable wheel elements. The robotic vehicle includes a controller having a memory and at least one processor. The at least one processor is configured to execute instructions stored in the memory so as to carry out operations. The operations include determining a desired path of the robotic vehicle and receiving, from the sensor, information indicative of an obstacle in the desired path of the robotic vehicle. The operations also include, based on the received information, causing the at least one actuator to adjust a position of at least one rotatable wheel element relative to the primary axis of rotation. Causing the at least one actuator to adjust a position of at least one rotatable wheel element includes causing the at least one actuator to move the at least one rotatable wheel element closer to or further from the primary axis. The operations also include causing the at least one motor to drive the at least one rotatable wheel element so as to allow the robotic vehicle to circumvent the obstacle and proceed along the desired path.

In an aspect, a method is provided. The method includes determining a desired path of a robotic vehicle and receiving, from a sensor, information indicative of an obstacle in the desired path of the robotic vehicle. The sensor is coupled to the robotic vehicle. The method includes, based on the received information, causing at least one actuator to adjust a position of at least one rotatable wheel element of a multi-wheel relative to a primary axis of rotation. The multi-wheel is configured to rotate about the primary axis of rotation. Causing the at least one actuator to adjust a position of at least one rotatable wheel element includes causing the at least one actuator to move the at least one rotatable wheel element closer to or further from the primary axis. The method further includes causing at least one motor to drive the at least one rotatable wheel element and at least one further motor to drive the multi-wheel about the primary axis so as to allow the robotic vehicle to circumvent the obstacle and proceed along the desired path.

Other aspects, features, and implementations will become apparent to those of ordinary skill in the art by reading the following detailed description, with reference where appropriate to the accompanying drawings.

DETAILED DESCRIPTION

I. Overview

Figure 1:
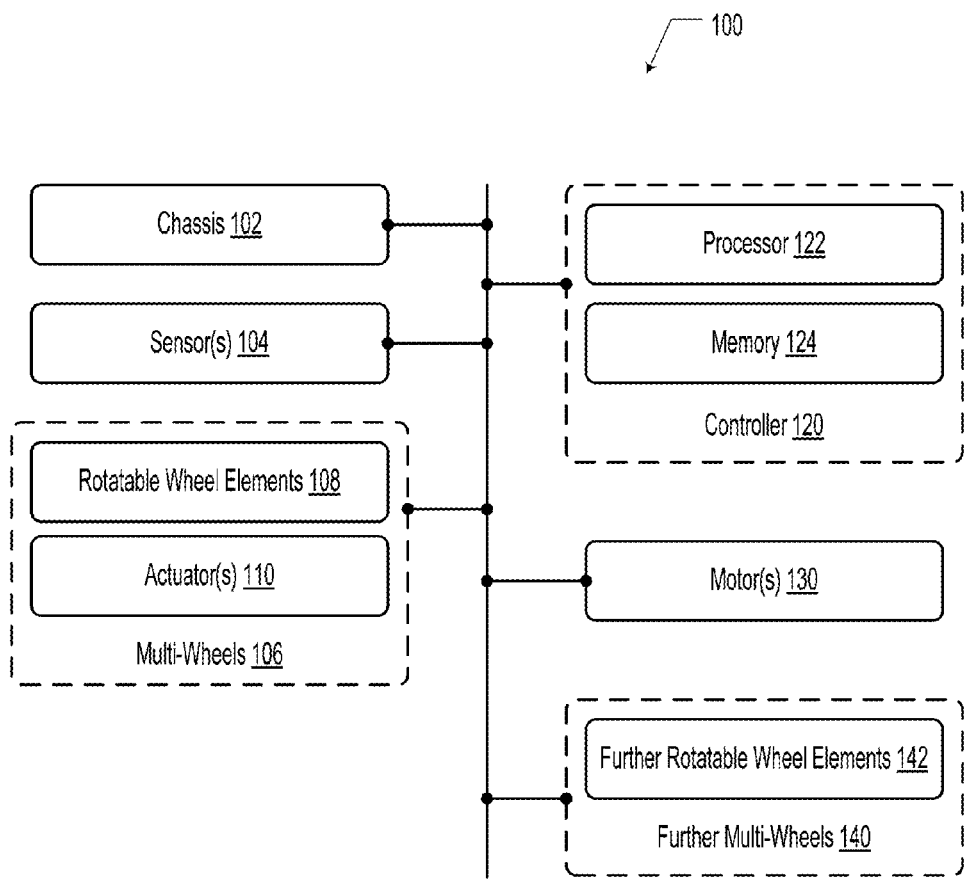
FIG. 1 illustrates a schematic diagram of a robotic vehicle, according to an example embodiment.

Implementations described herein may relate to a physically-reconfigurable robotic vehicle. That is, the robotic vehicle may include a plurality of multi-element wheels, which may be termed multi-wheels (e.g., wheels made up of a plurality of smaller wheels). In an example embodiment, each multi-wheel may include three wheel elements. However, more or fewer wheel elements are possible in the multi-wheels.

In an example embodiment, the wheel elements may be controllably adjusted in position with regard to a rotational axis of the respective multi-wheel. That is, one or more wheel elements of the respective multi-wheel may be moved outward or inward with respect to the rotational axis of the multi-wheel. Moving the wheel elements may provide that the robotic vehicle may change its configuration, shape, and/or pose. As an example, actuating the wheel elements of a given multi wheel may tilt or rotate the chassis of the robotic vehicle when the wheels are not obstructed.

Furthermore, the wheel elements of each multi-wheel may be coupled so as to rotate in the same direction at substantially the same rate of rotation. For example, the wheel elements of each multi-wheel may be coupled via an epicyclic gear system (e.g., a planetary gear train system) or a coupled belt or chain drive.

In such a scenario, a physical configuration of the robotic vehicle may be adjusted so as to more efficiently avoid or circumvent obstacles. For example, for a stair-climbing situation, a sensor may provide information indicative of a step depth, a step riser height, or a step riser slope. Based on such information, a controller may cause at least one wheel element to move with respect to the rotational axis of its respective multi-wheel. For example, the controller may actuate one or more linear actuators to move the wheel element of the multi-wheel. While stair-climbing scenarios are described and illustrated herein, it is understood that many other types of obstacles (e.g., rocks, hills, cracks, or other uneven surfaces) may need to be traversed. The embodiments described herein may be configured to circumvent any such other types of obstacles.

In an example embodiment, systems and methods described herein may include robotic vehicles with multi-wheels having an adjustable configuration of rotatable wheel elements. In some examples, an amount of extension for a given rotatable wheel element may relate to characteristics of an obstacle. For example, the configuration of rotatable wheel elements may be adjusted to correspond to different step heights. In such a scenario, an extension length amount of the given rotatable wheel element may correspond to an appropriate position of the wheel element with respect to the stair tread. In some embodiments, an appropriate position may be midway along the top portion of the stair tread or a "wedged" position wherein the wheel element is touching both the top portion of the stair tread as well as a vertical portion of the stair riser. Other extension length amounts and corresponding appropriate wheel element positions may be possible.

II. Example Robotic Vehicles

FIG. 1 illustrates a schematic block diagram of a robotic vehicle 100, according to an example embodiment. For instance, robotic vehicle 100 may include a chassis 102, one or more sensors 104, and at least two multi-wheels 106. The robotic vehicle 100 may also include a controller 120, one or more motors 130, and, optionally, two or more secondary multi-wheels 140.

The chassis 102 may include a main body of the robotic vehicle 100. The chassis 102 may house many different systems of the robotic vehicle 100. For example, the chassis 102 may house at least a portion of the mechanical drivetrain and suspension of the robotic vehicle 100. Additionally, the chassis 102 may include mounting locations for various elements of the robotic vehicle 100. For example, the one or more sensors 104, the at least two multi-wheels 106, motor(s) 130 and other systems may be mounted on or within the chassis 102. In an example embodiment, the chassis 102 may be formed from aluminum or another rigid material, such as plastic. However, other materials are contemplated.

The one or more sensors 104 may include devices configured to collect information that may provide situational and/or environmental awareness for the robotic vehicle 100. For example, the sensor(s) 104 may include one or more cameras, a global positioning system (e.g., GPS, GLONASS, etc.), an inertial measurement unit (IMU), a laser ranging system (e.g., a LIDAR system), a radar, a proximity detection system (e.g., ultrasonic detection system), or a sonar system. Other types of sensors are contemplated.

The multi-wheels 106 may be coupled to the chassis 102. The multi-wheels 106 may include several rotatable wheel elements 108 that may be coupled to one or more actuators 110. In an example embodiment, the multi-wheels 106 may rotate about respective primary axes. Furthermore, the multi-wheels 106 may include three rotatable wheel elements 108 configured to rotate about respective secondary axes. In other words, the three rotatable wheel elements 108 may be arranged such that their respective secondary axes are located along a given radial distance from the primary axis of the respective multi-wheels 106.

The one or more actuators 110 may be configured to adjust a position of one or more rotatable wheel elements 108 so as to adjust their respective radial distance from the primary axis of the respective multi-wheels 106. In an example embodiment, the actuator(s) 110 may include a linear actuator. The actuator(s) 110 may generally be operable to provide an actuation force that may be provided using a hydraulic or pneumatic cylinder, a ram, a screw-drive, a belt drive, or other means of moving one or more rotatable wheel elements 108 relative to the primary axis of the respective multi-wheels 106. In an example embodiment, the actuator(s) 110 may include a telescoping portion which may include a rotatably extendible portion (e.g., a jack screw extension) operable to mechanically adjust a length of the actuator(s) 110. Other types of telescoping portions and/or actuation systems are possible.

In some embodiments, a single actuator 110 in each multi-wheel 106 may be coupled to each of the respective rotatable wheel elements 108. In such a scenario, the actuator 110 may provide adjustment of the rotatable wheel elements 108 so they have an identical length with respect to the primary axis of the respective multi-wheels 106. Specifically, the actuator 110 may be coupled to a cam-based mechanism configured to make the rotatable wheel elements 108 "grow" at the same rate and to the same position relative to the primary axis.

In an alternative embodiment, multiple actuators 110 may provide such position control of the rotatable wheel elements 108. In such a scenario, a position of a single rotatable wheel element 108 could be independently controlled from that of other rotatable wheel elements 108 in the same multi-wheel 106.

It is understood that many other possible ways to adjust one or more rotatable wheel elements 108 of one or more multi-wheels 106. For example, many mechanical arrangements are possible to provide such functionality and each such possible embodiment is contemplated herein.

In an example embodiment, the multi-wheels 106 may be driven about their respective primary axes with motor(s) 130. In such a scenario, the motor(s) 130 may provide the drive torque, which may additionally or alternatively provided to rotatable wheel elements 108, which may be in contact with a ground surface. In some embodiments, the motor(s) 130 may be electric motors. Other types of motors are contemplated. In an example embodiment, a first motor or set of first motors may be configured to controllably drive the rotatable wheel elements 108. Furthermore, a second motor or set of second motors may be coupled to the respective multi-wheels 106. The second motor(s) may be configured to controllably drive the respective multi-wheels 106 about the primary axis. Additionally, in the case where two motors are driving two multi-wheels 106, the respective motors may be driven at differential rates so as to turn the robotic vehicle. Other types and arrangements of drivetrains are possible.

The rotatable wheel elements 108 that are in contact with the ground may provide movement for the robotic vehicle 100. In the scenario with three rotatable wheel elements 108 per multi-wheel 106, two of the three rotatable wheel elements 108 may be in contact with the ground during normal rolling operation. In some scenarios, such as when one of the rotatable wheel elements 108 becomes "blocked" by an obstruction, the multi-wheel 106 may rotate with respect to the secondary axis of the block rotatable wheel element. As such, the robotic vehicle may provide a stair-climbing capability, as described herein.

The controller 120 may include a processor 122 and a memory 124. The controller 120 includes a memory 124 configured to store computing instructions. The processor 122 is configured to execute the computing instructions so as to carry out various operations, as described below. The controller 120 may, but need not, be incorporated into the chassis 102. For example, the controller 120 may be located elsewhere as a mobile device such as a smartphone, laptop, tablet, or another type of computing device. In other implementations, the controller 120 may be incorporated, at least in part, into a cloud computing platform or another type of distributed computing system.

In an example embodiment, the robotic vehicle 100 may include one or more motors 130 configured to convert energy from an energy source (e.g., electrical energy from a battery) into mechanical energy. Specifically, the motor(s) 130 may provide controllable rotary force, or torque, to the rotatable wheel elements 108. In some cases, the motor(s) 130 may additionally be configured to provide torque to the primary axis of the multi-wheels 106. In some embodiments, each rotatable wheel element 108 may be coupled to a corresponding motor 130. In other embodiments, a single motor 130 may be coupled to several rotatable wheel elements 108 via an epicyclic gearing system or a belt/chain drive, as described elsewhere herein. In some embodiments, a plurality of motors 130 may each provide torque to a multi-wheel 106. In such a scenario, the respective motors 130 may be operated in a differential fashion, for example to turn the robotic vehicle 100.

It is understood that many other mechanical arrangements are possible that may be configured to provide torque to the rotatable wheel elements 108 of a multi-wheels 106 as described herein. All such other mechanical arrangements are contemplated herein.

As described above, the controller 120 may be configured to carry out various operations. For example, the controller 120 may determine a desired path of the robotic vehicle 100. In such a scenario, the controller 120 may have a predetermined route so as to move from a first location to a second location. Alternatively or additionally, the controller 120 may determine the desired path based on sensor information from sensor(s) 104. For example, the controller 120 may receive image information from a camera and/or point cloud data from a LIDAR system. The controller 120 may additionally or alternatively receive map data with which to determine the desired path of the robotic vehicle 100. Other ways to determine the desired path are possible.

The operations may include receiving, from the sensor(s) 104, information indicative of an obstacle in the desired path of the robotic vehicle 100. In an example embodiment, a camera, radar, and/or LIDAR may provide information about an obstacle to the controller 120. The obstacle could include a physical barrier or a restricted area/zone. For example, the sensors 104 may provide image information about a set of stairs in the desired path of the robotic vehicle 100.

The received information may be analyzed to determine various characteristics about the obstacle. For example, in the scenario involving stairs, at least one dimension of the stairs may be determined based on the received information. As such, characteristics about the stairs, such as step depth, step riser height, and/or step riser slope may be determined.

The operations may include, based on the received information, causing at least one actuator 110 to adjust a position of at least one rotatable wheel element 108 relative to the primary axis of rotation. That is, the controller 120 may cause actuator 110 to extend or retract based on the received information. In an example embodiment, the actuator 110 may be extended or retracted based on the determined step depth, step riser height, and/or step riser slope so as to most efficiently circumvent the stairs (e.g., to avoid slippage, wheel misplacement, ensure sufficient clearance with stair treads, etc.).

In a further embodiment, causing at least one actuator 110 to adjust a position of at least one rotatable wheel element 108 may include moving at least one rotatable wheel element 108 closer to or further from the primary axis. For example, the respective actuator 110 may cause the rotatable wheel element 108 to move radially toward or away from the primary axis of the respective multi-wheel 106. In other embodiments, the actuator 110 may move the rotatable wheel element 108 in an azimuthal direction with respect to the primary axis of the respective multi-wheel 106. Other ways to adjust a position of the rotatable wheel elements 108 with respect to one another are possible.

In some embodiments, by moving the rotatable wheel element 108, a stability of the robotic vehicle 100 may be adjusted. For example, in an effort to maximize the stability of the robotic vehicle, the rotatable wheel element(s) 108 may be retracted as much as possible toward the primary axis of the multi-wheels 106. That is, fully retracting the rotatable wheel elements 108 may provide a robotic vehicle 100 that is less prone to tipping over. Other configurations of the rotatable wheel element(s) 108 may provide a desired amount of stability based on a given operational mode or functional pose (e.g., horizontal rolling or vertical standing) for the robotic vehicle 100.

In some embodiments, the controller 120 may adjust the actuator(s) 110 according to historical data from prior attempts to circumvent a given obstacle. For example, the robotic vehicle 100 may have previously attempted to circumvent a given set of stairs with a variety of different positions of actuator 110 (e.g., different multi-wheel configurations). As such, the controller 120 may adjust the actuator(s) 110 based on a prior "best case" attempt (e.g., an attempt involving the least slippage, least tipping, etc.). In such a scenario, the robot vehicle may create an internal "map" of the environment such that actuator positioning can quickly be adjusted for a variety of obstacles in the mapped environment without requiring extensive use of sensors and computation.

The operations may include causing at least one motor 130 to drive the at least one rotatable wheel element 108 so as to allow the robotic vehicle 100 to circumvent the obstacle and proceed along the desired path. That is, the controller 120 may control the motors 130 so as to rotate the respective rotatable wheel elements 108 and propel the robotic vehicle 100.

As described above, sensor(s) 104 may include an IMU. In such a scenario, the information received by the controller may include information indicative of a center of gravity (COG) of the robotic vehicle 100. Under such conditions, causing the at least one actuator 110 to adjust a position of the at least one rotatable wheel element 108 is based on the COG information. As an example, COG information may be utilized to determine a proper position and/or physical configuration of the respective multi-wheels 106. In an example embodiment, the COG information may include an indication that the robotic vehicle 100 is slipping (e.g., losing traction) on the stairs (or other obstacle). In such a scenario, the robotic vehicle 100 may take corrective action (e.g., adjust a position of the rotatable wheel element 108) so as to recover traction and/or stability.

Similarly, the IMU may provide information indicative of an unbalanced condition of the robotic vehicle 100. That is, the unbalanced condition may include situations where the robotic vehicle 100 is close to (or in the process of) tipping over. In such a scenario, at least one actuator 110 may be adjusted so as to move the rotatable wheel element 108 and correct the unbalanced condition.

In an example embodiment, the multi-wheels 106 may include at least two sets of tri-wheels rotatably coupled to the chassis 102. In such a scenario, each tri-wheel includes three rotatable wheel elements 108. Also, the one or more actuators 110 are configured to extend or retract all of the rotatable wheel elements 108 with respect to the primary axis of rotation. As such, the at least one actuator 110 may be configured to adjust a common radial distance of the rotatable wheel elements 108 with respect to the primary axis of rotation. That is, actuator(s) 110 may position each rotatable wheel element 108 such that they are jointly controlled to be at the same radial distance with regard to the primary axis of the respective multi-wheel 106. In other embodiments, a respective position of each rotatable wheel element 108 may be separately controlled.

Optionally, some embodiments may include a plurality of further multi-wheels 140 coupled to the chassis 102. Each of the further multi-wheels 140 may include a plurality of further rotatable wheel elements 142. In an example embodiment, a pair of multi-wheels 106 may be "drive" wheels configured to provide rolling propulsion for the robotic vehicle 100. In such a scenario, a pair of further multi-wheels 140, and the respective further rotatable wheel elements 142, may be configured to spin/rotate freely about a further axis of rotation. That is, the further multi-wheels 140 may provide a rolling stability point (or plurality of points) near a rear portion of the robotic vehicle 100. In such a scenario, the further multi-wheels 140 may reduce drag friction related to the rear portion of the robotic vehicle 100. As such, the robotic vehicle 100 may be able to more easily circumvent stairs and other types of obstacles.

Figure 2A:
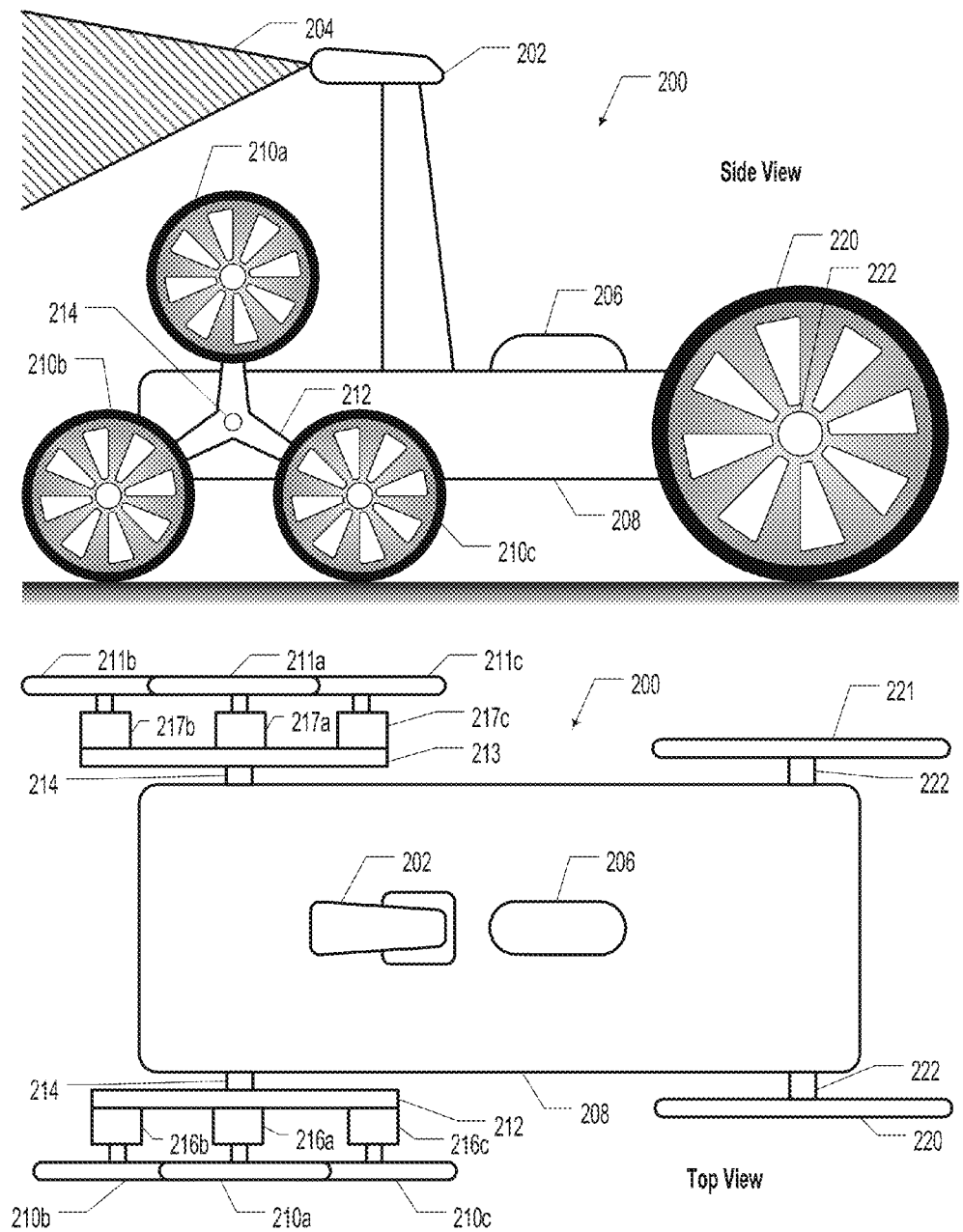
FIG. 2A illustrates a side view and a top view of a robotic vehicle, according to an example embodiment.

FIG. 2A illustrates a side view and a top view of a robotic vehicle 200, according to an example embodiment. The robotic vehicle 200 may be similar or identical to robotic vehicle 100 as illustrated and described with regard to FIG. 1. For example, robotic vehicle 200 may include a chassis 208, a sensor 202, a controller 206, and multi-wheels 212 and 213.

The multi-wheels 212 and 213 may be configured to rotate about an axis 214 that could, but need not, be coupled between multi-wheels 212 and 213. The multi-wheels 212 and 213 may include respective rotatable wheel elements 210a-c and 211a-c. Furthermore, each of the wheel elements 210a-c and 211a-c may be coupled to respective motors 216a-c and 217a-c. In other embodiments, the wheel elements 210a-c may be driven via a first motor and the wheel element 211a-c may be driven via a second motor.

The robotic vehicle 200 may include a set of passive "follower" wheels 220 and 221 that are configured to rotate about a further primary axis 222.

As described herein, sensor 202 may include a variety of different devices, such as a camera. The sensor 202 may have a field of view 204.

Figure 2B:
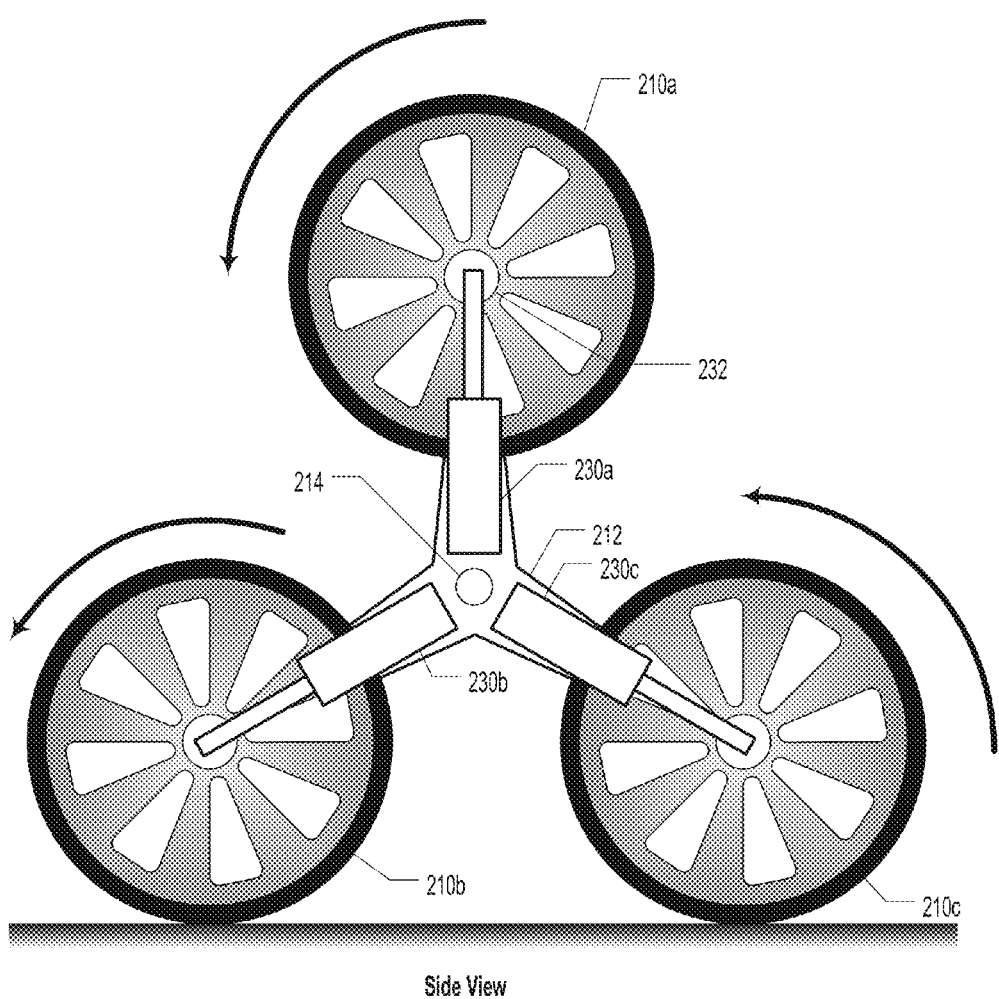
FIG. 2B illustrates an isolated side view of a multi-wheel, according to an example embodiment.

FIG. 2B illustrates an isolated side view of a multi-wheel 212, according to an example embodiment. The multi-wheel 212 may include rotatable wheel elements 210a-c. Each of the rotatable wheel elements 210a-c may be configured to rotate about respective secondary axes of rotation 232. Furthermore, each rotatable wheel element 210a-c may be coupled to the multi-wheel 212, at least in part, via respective actuators 230a-c.

In an example embodiment, each rotatable wheel element 210a-c may be controlled to rotate in the same direction, and at the same rotational speed, as that of the other rotatable wheel elements of multi-wheel 212. That is, the rotatable wheel elements 210a-c may be configured to controllably rotate in the same direction around their respective secondary axes 232.

For instance, although not illustrated in FIG. 2B, rotatable wheel elements 210a-c may be coupled via an epicyclic gearing system. The epicyclic gearing system may include a central sun gear and planet gears corresponding to each rotatable wheel element. In such a scenario, each of the rotatable wheel elements 210a-c may be controllably driven via a single motor coupled to the sun gear. In an example embodiment, the sun gear need not be coupled to the primary axis of rotation of the multi-wheel 214. That is, the multi-wheel 212 may be configured to be driven about the primary axis of rotation 214. Additionally or alternatively, the rotatable wheel elements in contact with a ground surface may be driven so as to move the robotic vehicle 200.

Additionally or alternatively, the rotatable wheel elements 210a-c may be coupled via a chain or belt-drive system. In such a scenario, a motor may provide torque to each of the rotatable wheel elements 210a-c via such a chain or belt-drive system. Similar to other embodiments above, such a chain or belt-drive system need not be coupled to the primary axis of rotation 214. A further motor may be configured to drive the respective multi-wheels 212 about their respective primary axis 214. Other ways to cause the rotatable wheel elements 210a-c and the multi-wheels 212 to rotate are possible.

Figure 2C:
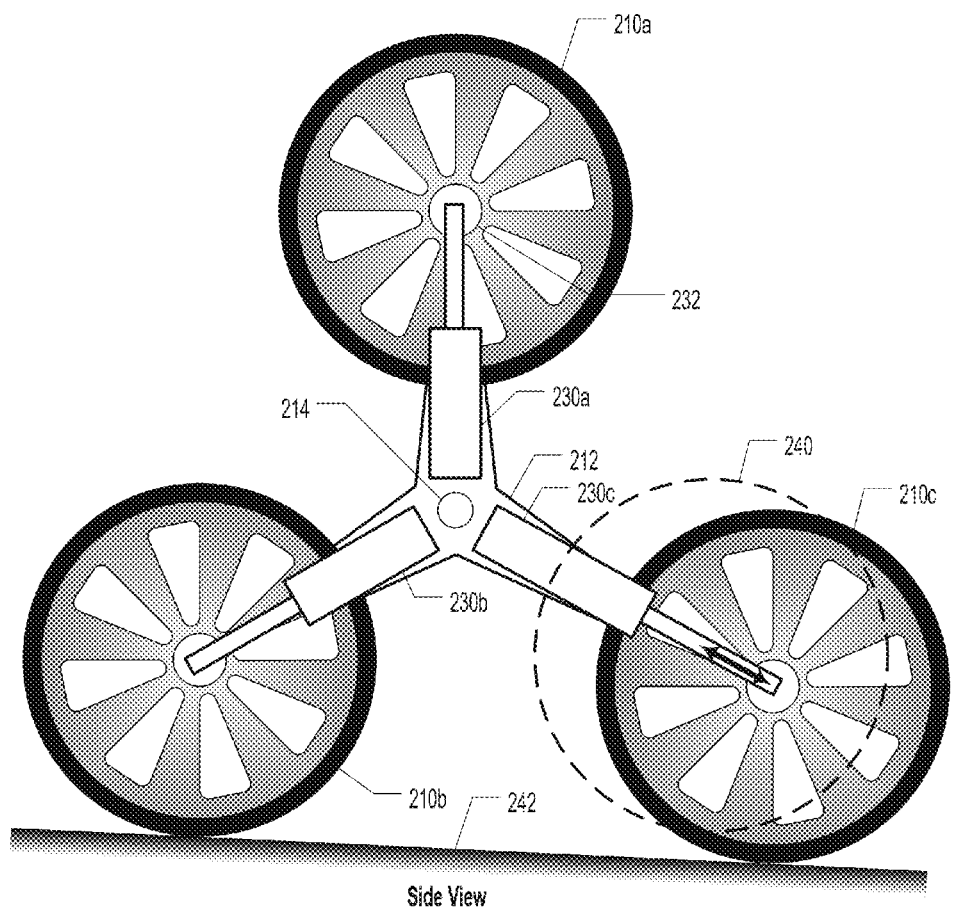
FIG. 2C illustrates an isolated side view of a multi-wheel, according to an example embodiment.

FIG. 2C illustrates an isolated side view of a multi-wheel 212, according to an example embodiment. In the illustrated scenario, actuator 230 has extended such that rotatable wheel element 210c has moved radially away from primary axis 214 from prior wheel position 240. In such a situation, a position, angle, or arrangement of the robotic vehicle 200 may change. For instance, such a situation may occur to provide better stability or to adjust a center of gravity of the robotic vehicle 200 on a sloped ground surface 242.

Figure 2D:
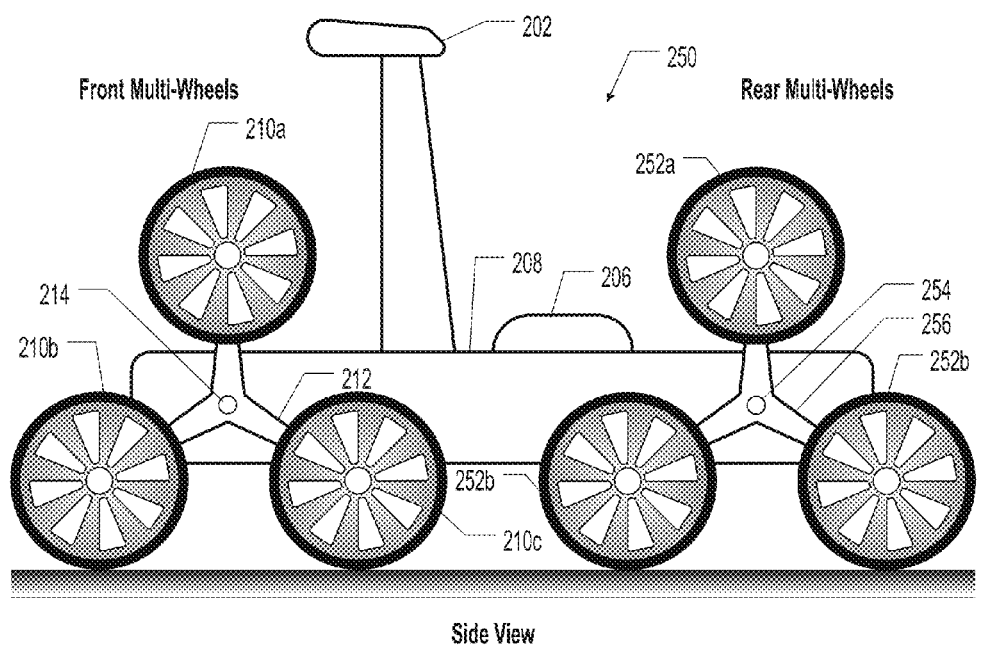
FIG. 2D illustrates a side view of a robotic vehicle, according to an example embodiment.

FIG. 2D illustrates a side view of a robotic vehicle 250, according to an example embodiment. Robotic vehicle 250 may be similar to robotic vehicles 100 and 200 as illustrated and described with regard to FIGS. 1 and 2A. Namely, the robotic vehicle 250 may include one or more multi-wheels 212 arranged near a front portion of the robotic vehicle 250. Furthermore, robotic vehicle 250 may include a further set of passive multi-wheels 256 which may be arranged near a rear portion of the robotic vehicle 250. The further set of passive multi-wheels 256 may be configured to freely rotate about further primary axis 254. In such a scenario, rotatable wheel elements 252a-c may also be configured to freely rotate about their respective secondary axes (e.g., as unpowered caster wheels). In some embodiments, rotatable wheel elements 252a-c may be driven via one or more motors to provide "all-wheel" drive for the robotic vehicle 250. Other ways to utilize a second set of multi-wheels 256 so as to aid movement of robotic vehicle 250 are contemplated herein.

Figure 3A:
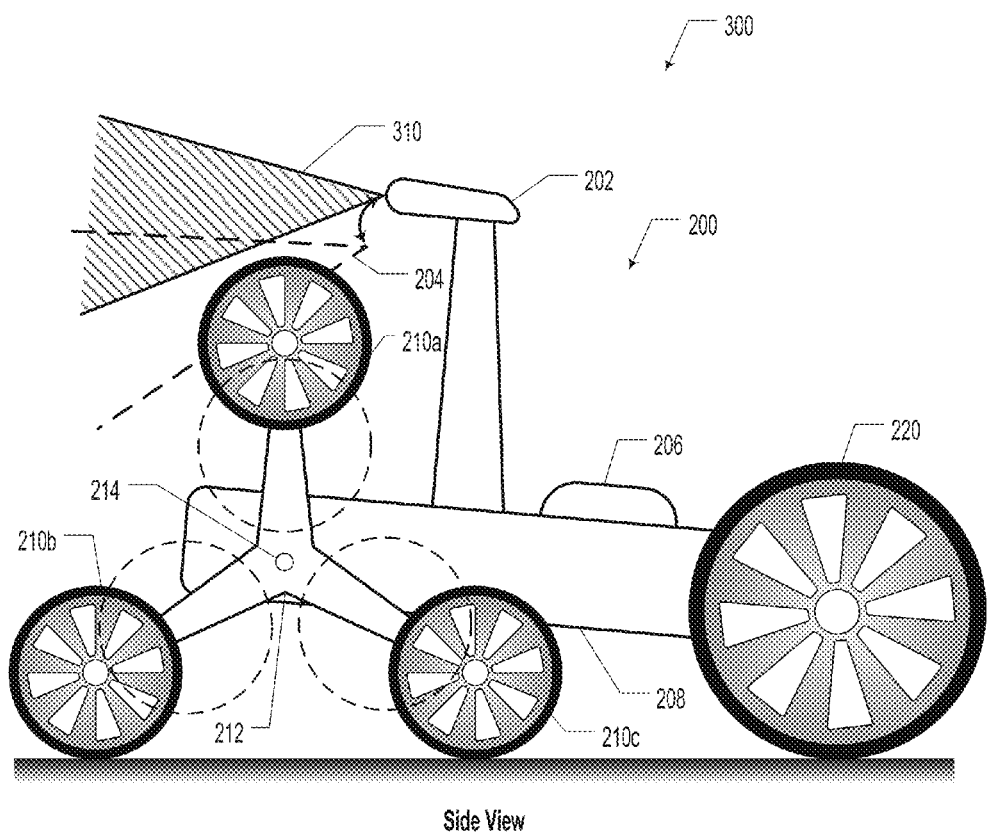
FIG. 3A illustrates a scenario involving a robotic vehicle, according to an example embodiment.

FIG. 3A illustrates a scenario 300 involving robotic vehicle 200, according to an example embodiment. Scenario 300 includes rotatable wheel elements 210a-c extending radially from prior positions with respect to a primary axis 214 of multi-wheel 212. Such an extension of the rotatable wheel elements 210a-c may cause the chassis 208 to raise and/or incline. That is, chassis 208 may be inclined at an angle 302. Furthermore, sensor 202 may have an elevated field of view 310 with respect to the prior field of view 204. In other words, by changing the relative positions of the rotatable wheel elements 210a-c, a position (e.g., height, angle, etc.) of the chassis 208 and other elements of robotic vehicle 200 may be adjusted. As such, robotic vehicle 200 may be able to controllably adjust its sensor field of view, reach (for example if the robotic vehicle includes one or more robotic arms), adjust ground clearance (to avoid rocks and other obstacles), or otherwise adjust its position for any other purpose.

Figure 3B:
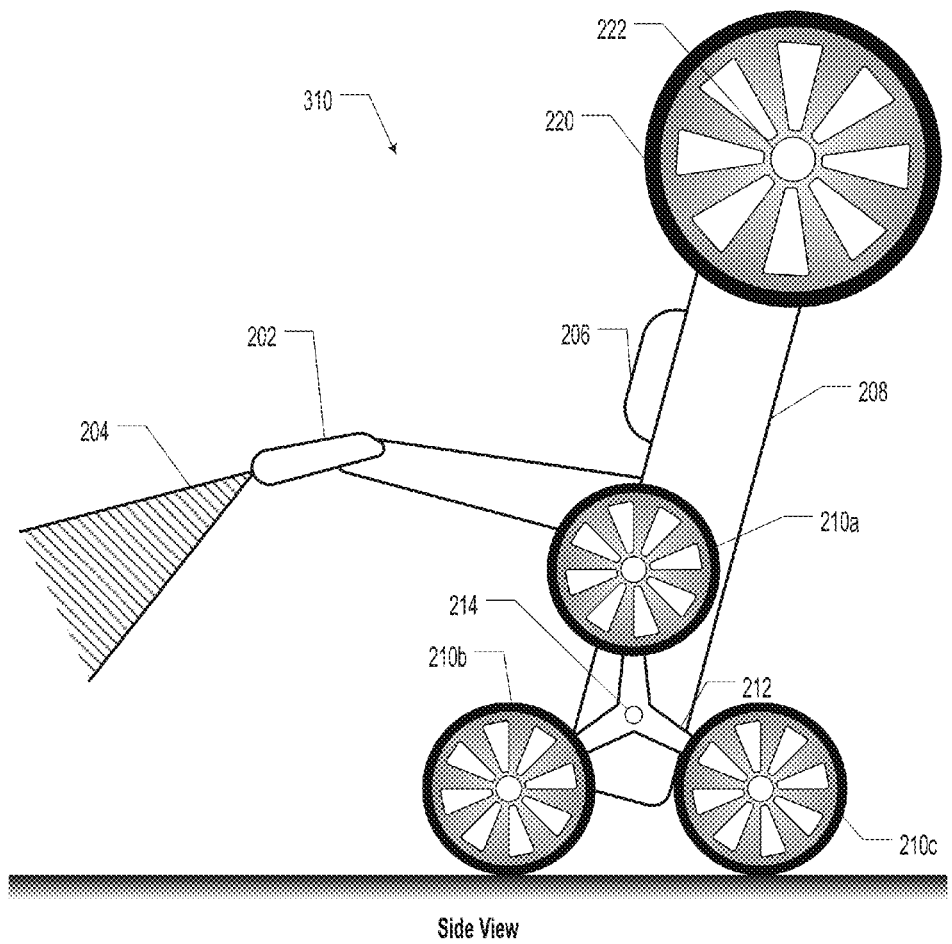
FIG. 3B illustrates a scenario involving a robotic vehicle, according to an example embodiment.

FIG. 3B illustrates a scenario 310 involving robotic vehicle 200, according to an example embodiment. In such a scenario, the robotic vehicle may determine, by the use of its sensor(s), that a required turn through a corridor or doorway is too narrow for the nominal robot configuration. Based on this data, the robotic vehicle 200 could reduce its footprint by rotating its rear portion up about the primary axis and holding the pose while balancing on the multi-wheel(s) 212. To reduce the chance of tipping while balancing in this pose, one or more of the rotatable wheel elements 210a-c on the multi-wheel(s) 212 may extend out to better support the robotic vehicle 200. Furthermore, in some situations, such as interacting with people or objects, the robot may adapt to this configuration. In such scenarios, the elevated portion of the robotic vehicle 200 may be equipped with sensors and a display (not illustrated) to provide a better capability to interact with people and the environment.

FIGS. 4A-4G illustrate various scenes in a stair-climbing scenario involving robotic vehicle 200. While the scenario illustrates stairs, it is understood that the same systems and methods could be applied to a wide variety of other obstacles. For example, similar scenarios including rocks, hills, or any other type of ground surface variation (e.g., topography) are contemplated herein. Furthermore, while stair-climbing is illustrated and described herein, it is understood that similar systems and methods could be applied to stair-descending scenarios as well.

Figure 4A:
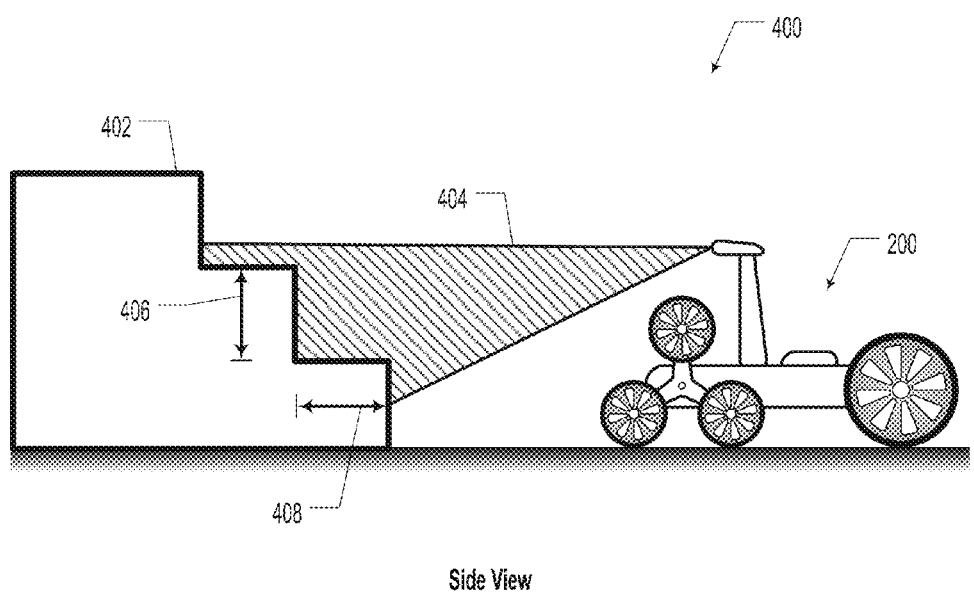
FIG. 4A illustrates a robotic vehicle scenario, according to an example embodiment.

FIG. 4A illustrates a robotic vehicle scenario 400, according to an example embodiment. As illustrated in scenario 400, robotic vehicle 200 may gather sensor data by scanning or imaging a field of view 404. As described herein, the robotic vehicle may gather various types of sensor data, such as that from cameras, LIDARs, RADARs, or other types of proximity sensors, etc. The field of view 404 may include a set of stairs 402 or another type of obstacle.

In an example embodiment, information about the scene may be gathered by sensors (e.g., sensor(s) 104) and provided to controller 120. Based on the received information, controller 120 may determine various characteristics about the set of stairs 402 such as a step depth 408 and/or a step riser height 406.

Figure 4B:
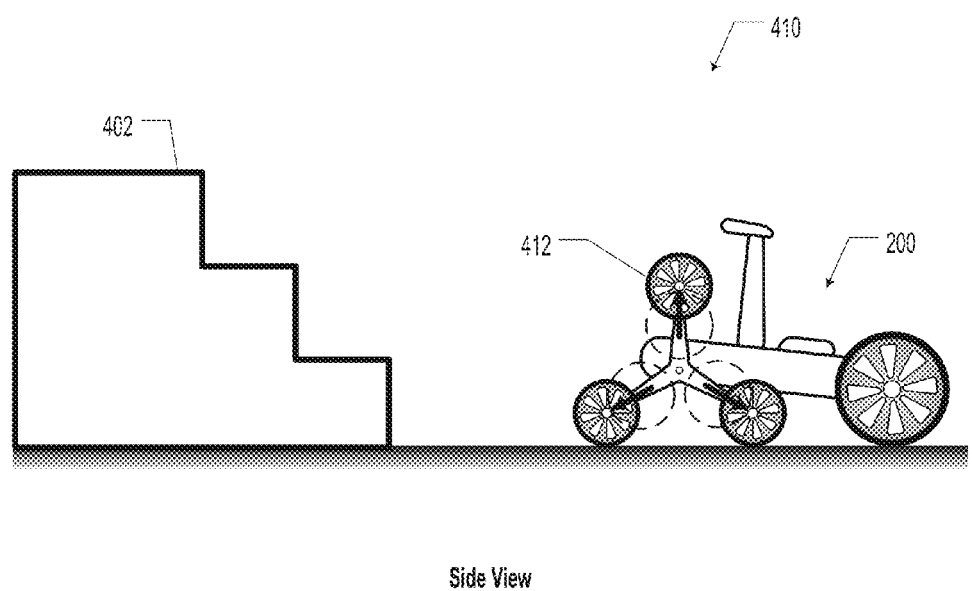
FIG. 4B illustrates a robotic vehicle scenario, according to an example embodiment.

FIG. 4B illustrates a robotic vehicle scenario 410, according to an example embodiment. Based on the characteristics of the obstacle (e.g., the step depth 408 and/or step riser height 406), the robotic vehicle 200 may adjust a position of one or more rotatable wheel elements 412. For example, for a given step depth 408 and/or step riser height 406, the controller 120 may cause the actuator(s) 110 to move the rotatable wheel elements 412 to a predetermined position. Note that the rotatable wheel elements 412 may be extended or retracted based on the received information. In an embodiment, the controller 120 may have a lookup table for a given set of step characteristics. In other embodiments, the controller 120 may compute the proper positions of the rotatable wheel elements 412 "on the fly." Furthermore, positions of the rotatable wheel elements 412 may be adjusted while circumventing the obstacle (e.g., the stairs). In an example embodiment, the controller 120 may periodically and/or continuously adjust the positions of the rotatable wheel elements 412 based on real-time image, location, center-of-gravity, and/or balance information.

Figure 4C:
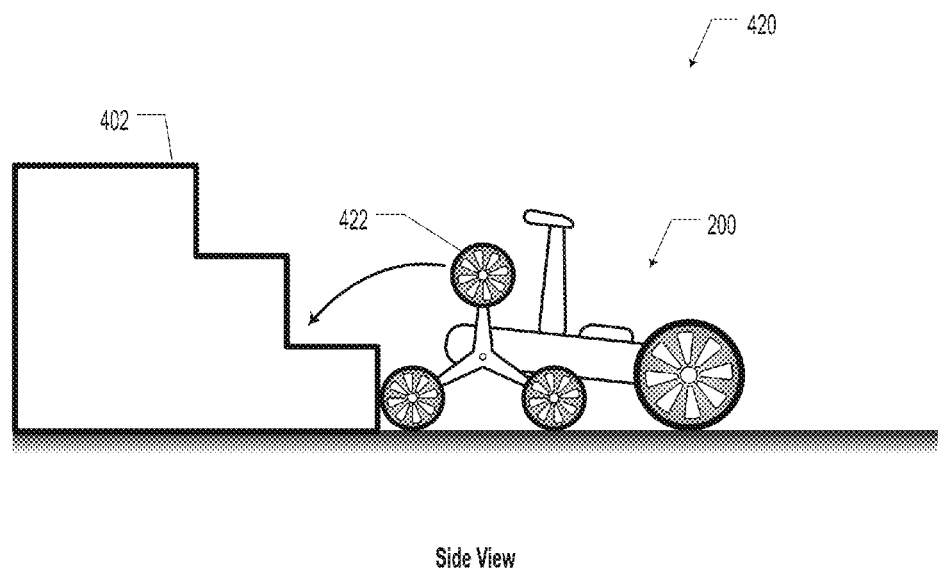
FIG. 4C illustrates a robotic vehicle scenario, according to an example embodiment.

FIG. 4C illustrates a robotic vehicle scenario 420, according to an example embodiment. In scenario 420, the robotic vehicle 200 has rolled closer to the stairs 402 such that one of the three rotatable wheel elements 422 is now in contact with the first step riser. In such a scenario, the torque applied to the rotatable wheel elements 422 is translated to the primary axis of the multi-wheel (due to the blocked rotatable wheel element). For example, the multi-wheel may be driven via the primary axis. That is, in some embodiments, the multi-wheel may be configured to provide torque so as to move the robotic vehicle through the environment. Furthermore, rotatable wheel element 422 may move towards a surface of the first step.

Figure 4D:
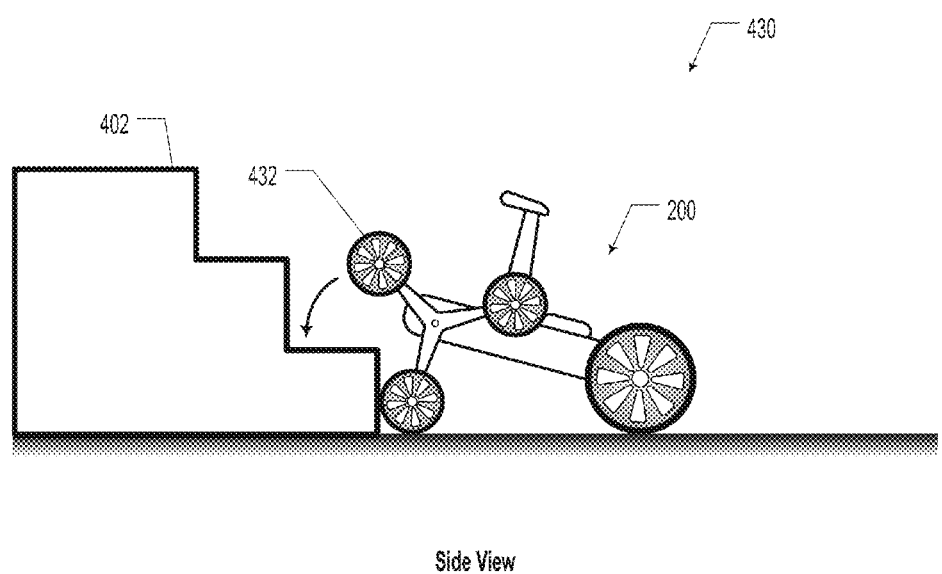
FIG. 4D illustrates a robotic vehicle scenario, according to an example embodiment.

FIG. 4D illustrates a robotic vehicle scenario 430, according to an example embodiment. In scenario 430, the multi-wheel is further rotating in a counter-clockwise manner. In such a scenario, rotatable wheel element 432 is rotating counter-clockwise and downward towards the surface of the first step.

Figure 4E:
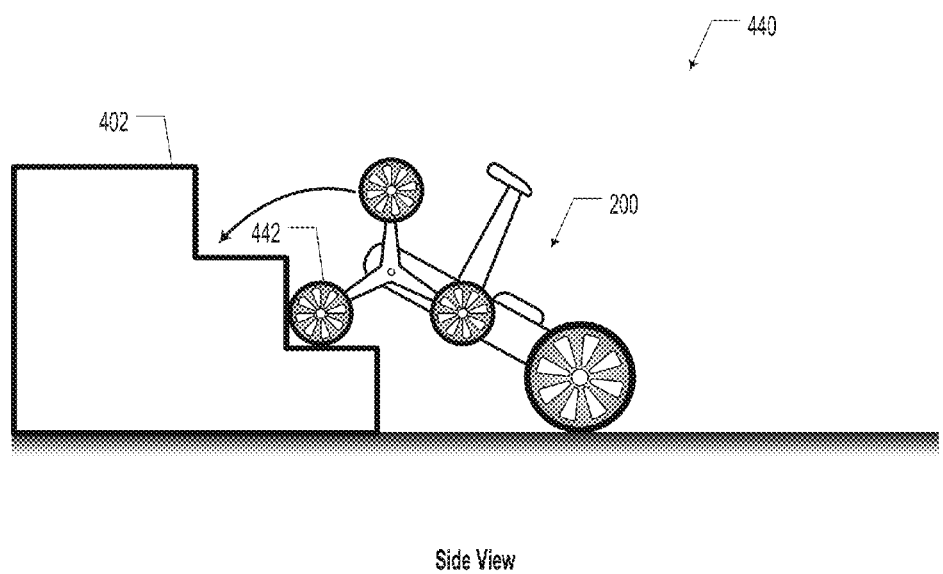
FIG. 4E illustrates a robotic vehicle scenario, according to an example embodiment.

FIG. 4E illustrates a robotic vehicle scenario 440, according to an example embodiment. In scenario 440, the multi-wheel has rotated such that a rotatable wheel element 442 is resting on the first step and is being blocked by the second step riser.

Figure 4F:
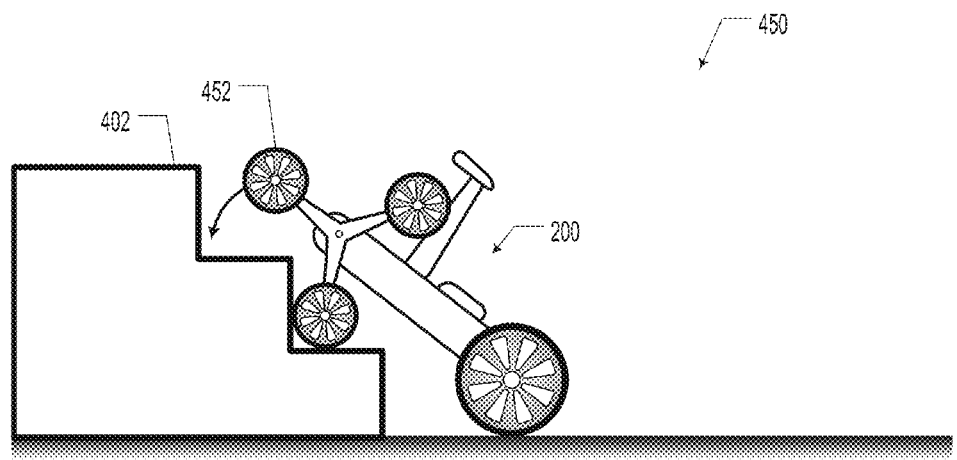
FIG. 4F illustrates a robotic vehicle scenario, according to an example embodiment.

FIG. 4F illustrates a robotic vehicle scenario 450, according to an example embodiment. As illustrated in scenario 450, the rotatable wheel element 452 is rotating towards the top surface of the second step.

Figure 4G:
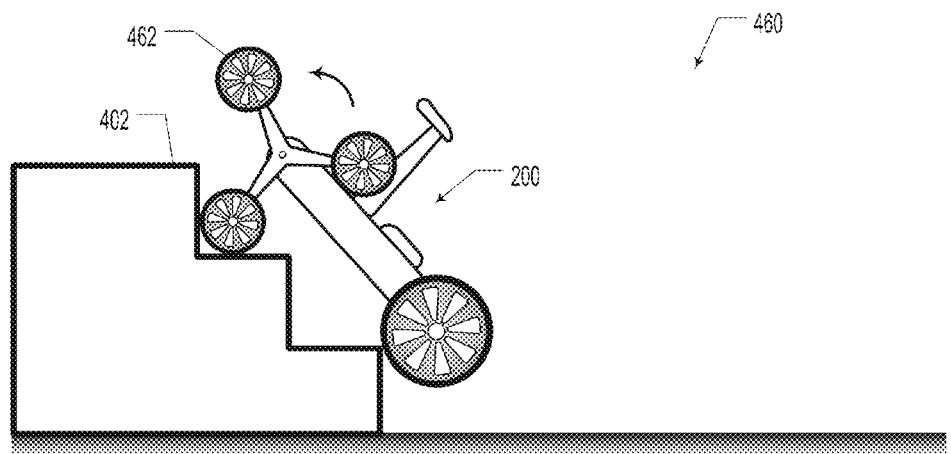
FIG. 4G illustrates a robotic vehicle scenario, according to an example embodiment.

FIG. 4G illustrates a robotic vehicle scenario 460, according to an example embodiment. As illustrated in scenario 460, the rotatable wheel element 462 is rotating towards the surface of the third step (top landing) of stairs 402. In such a fashion, robotic vehicle 200 may be able to efficiently circumvent or otherwise overcome various obstacles, such as stairs 402.

III. Example Methods

Figure 5:
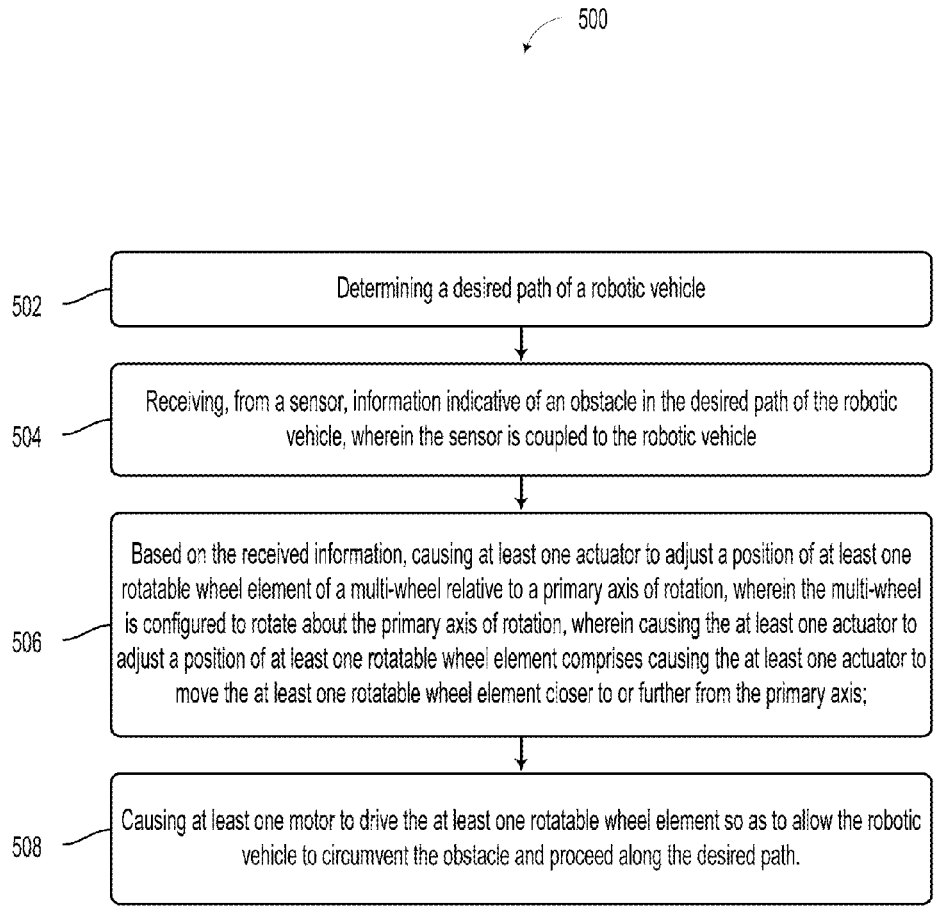
FIG. 5 illustrates a method, according to an example embodiment.

FIG. 5 illustrates a method 500, according to an example implementation. The method 500 may include various blocks or steps. The blocks or steps may be carried out individually or in combination. The blocks or steps may be carried out in any order and/or in series or in parallel. Further, blocks or steps may be omitted or added to method 500.

The blocks of method 500 may be carried out by various elements of the robotic vehicles 100, 200, and 250 as illustrated and described in reference to FIGS. 1, 2A, 2C, 3, and 4A-4G As an example, blocks of method 500 may be carried out by the controllers 120 and 206.

Block 502 includes determining a desired path of a robotic vehicle. Determining the desired path of the robotic vehicle may include receiving information about a given route or movement path for the robotic vehicle to move from a first location to a second location. Additionally or alternatively, determining the desired path may include obtaining information regarding a possible path for the robotic vehicle.

Block 504 includes receiving, from a sensor, information indicative of an obstacle in the desired path of the robotic vehicle. The sensor (e.g., sensor(s) 104) may be coupled to the robotic vehicle. In an example embodiment, the obstacle may include stairs, such as stairs 402 as illustrated in FIGS. 4A-4G However, other obstacles (e.g., rocks) and conditions (e.g., uneven or slanted ground surface) are contemplated herein.

As described elsewhere herein, the sensor may include an IMU. In such a scenario, the IMU may provide information indicative of a center of gravity of the robotic vehicle. As such, causing the at least one actuator to adjust a position of the at least one rotatable wheel element could be based on the center of gravity information.

Additionally or alternatively, an IMU may provide information indicative of an unbalanced condition of the robotic vehicle. In such a scenario, causing the at least one actuator to adjust a position of the at least one rotatable wheel element could be based on correcting the unbalanced condition.

In some embodiments, the sensor may include an image sensor. In such a scenario, the method may include receiving, from the image sensor, information indicative about the obstacle. For instance, the information may include characteristic dimensions of the obstacle. The position of the rotatable wheel element(s) may be adjusted based on the characteristic dimensions of the obstacle so as to most efficiently circumvent or otherwise avoid it. In the case of stairs, the at least one actuator may be adjusted such that a position of the at least one rotatable wheel element is based on at least one dimension of the stairs.

Block 506 includes, based on the received information, causing at least one actuator to adjust a position of at least one rotatable wheel element of a multi-wheel relative to a primary axis of rotation. That is, the multi-wheel may be configured to rotate about the primary axis of rotation. Furthermore, causing the at least one actuator to adjust a position of at least one rotatable wheel element may include causing the at least one actuator to move the at least one rotatable wheel element closer to or further from the primary axis.

In some embodiments, causing the at least one actuator to adjust a position of the at least one rotatable wheel element may include retracting the at least one rotatable wheel such that a height of the robotic vehicle becomes smaller. In yet further embodiments, causing the at least one actuator to adjust a position of the at least one rotatable wheel element may include extending the at least one rotatable wheel such that a height of the robotic vehicle becomes larger.

In still further embodiments, causing the at least one actuator to adjust a position of the at least one rotatable wheel element may include adjusting the at least one rotatable wheel element in an azimuthal direction with respect to the primary axis of rotation.

Block 508 includes causing at least one motor to drive the at least one rotatable wheel element and at least one further motor to drive the multi-wheel about the primary axis so as to allow the robotic vehicle to circumvent the obstacle and proceed along the desired path. In an example embodiment, a first motor may provide torque to drive the rotatable wheel elements of a given multi-wheel of the robotic vehicle. In such a scenario, at least one further motor may provide torque to drive the multi-wheels. For example, each multi-wheel may include respective motors to drive the respective multi-wheels about their primary axes in a differential manner, which may provide turning capability.

The particular arrangements shown in the Figures should not be viewed as limiting. It should be understood that other implementations may include more or less of each element shown in a given Figure. Further, some of the illustrated elements may be combined or omitted. Yet further, an illustrative implementation may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and implementations have been disclosed, other examples and implementations will be apparent to those skilled in the art. The various disclosed examples and implementations are for purposes of illustration and are not intended to be limiting, with the true scope and spirit being indicated by the following claims.

What is claimed is:

1. A robotic vehicle comprising:
   a chassis;
   a sensor coupled to the chassis;
   a plurality of multi-wheels coupled to the chassis, wherein each multi-wheel is configured to rotate about a respective primary axis of rotation, wherein each multi-wheel comprises a plurality of rotatable wheel elements, wherein each rotatable wheel element is configured to rotate about a respective secondary axis of rotation;
   at least one actuator configured to extend or retract at least one rotatable wheel element such that a position of at least one rotatable wheel element is adjustable relative to the respective primary axis of rotation;
   at least one motor coupled to at least one rotatable wheel element and configured to drive the at least one rotatable wheel element about its respective secondary axes of rotation; and
   at least one further motor coupled to at least one multi-wheel of the plurality of multi-wheels, wherein the at least one further motor is configured to drive the at least one multi-wheel about its respective primary axis.

2. The robotic vehicle of claim 1, further comprising:
   a controller comprising a memory and at least one processor, wherein the at least one processor is configured to execute instructions stored in the memory so as to carry out operations, the operations comprising:
   determining a desired path of the robotic vehicle;
   receiving, from the sensor, information indicative of an obstacle in the desired path of the robotic vehicle;
   based on the received information, causing the at least one actuator to adjust a position of at least one rotatable wheel element relative to its respective primary axis of rotation, wherein causing the at least one actuator to adjust a position of at least one rotatable wheel element comprises causing the at least one actuator to move the at least one rotatable wheel element closer to or further from the respective primary axis; and
   causing the at least one motor to drive the at least one rotatable wheel element and the at least one further motor to drive the at least one multi-wheel so as to allow the robotic vehicle to circumvent the obstacle and proceed along the desired path.

3. The robotic vehicle of claim 2, wherein the sensor comprises an inertial measurement unit (IMU) wherein the operations further comprise receiving, from the IMU, information indicative of a center of gravity of the robotic vehicle, wherein causing the at least one actuator to adjust a position of the at least one rotatable wheel element is based on the received information.

4. The robotic vehicle of claim 2, wherein the sensor comprises an inertial measurement unit (IMU) wherein the operations further comprise receiving, from the IMU, information indicative of an unbalanced condition of the robotic vehicle, wherein causing the at least one actuator to adjust a position of the at least one rotatable wheel element is based on correcting the unbalanced condition.

5. The robotic vehicle of claim 2, wherein the sensor comprises an image sensor, wherein the operations further comprise receiving, from the image sensor, information indicative of the obstacle comprising stairs, wherein causing the at least one actuator to adjust a position of the at least one rotatable wheel element is based on at least one dimension of the stairs.

6. The robotic vehicle of claim 5, wherein the at least one dimension of the stairs comprises at least one of: a step depth, a step riser height, or a step riser slope.

7. The robotic vehicle of claim 2, wherein the sensor comprises an image sensor, wherein the operations further comprise receiving, from the image sensor, information indicative of the obstacle, wherein causing the at least one actuator to adjust a position of the at least one rotatable wheel element is based on the received information.

8. The robotic vehicle of claim 1, wherein the at least one actuator is further configured to move the at least one rotatable wheel element in an azimuthal direction with respect to the respective primary axis of rotation.

9. The robotic vehicle of claim 1, wherein the at least one actuator comprises at least one of a hydraulic cylinder, a pneumatic cylinder, a cam, or a lead screw arrangement.

10. The robotic vehicle of claim 1, wherein the plurality of multi-wheels comprises at least two sets of tri-wheels rotatably coupled to the chassis, wherein each tri-wheel comprises three rotatable wheel elements, wherein the at least one actuator is configured to extend or retract all of the rotatable wheel elements with respect to their respective primary axis of rotation, wherein the at least one actuator is further configured to adjust a common radial distance of the rotatable wheel elements with respect to the respective primary axis of rotation.

11. A robotic vehicle comprising:
   a chassis;
   a sensor coupled to the chassis;
   a plurality of multi-wheels coupled to the chassis, wherein each multi-wheel is configured to rotate about a respective primary axis of rotation, wherein each multi-wheel comprises a plurality of rotatable wheel elements, wherein each rotatable wheel element is configured to rotate about a respective secondary axis of rotation;
   at least one actuator configured to extend or retract at least one rotatable wheel element such that a position of at least one rotatable wheel element is adjustable relative to the respective primary axis of rotation;
   at least one motor coupled to at least one rotatable wheel element and configured to drive the at least one rotatable wheel element about its respective secondary axes of rotation;
   at least one further motor coupled to at least one multi-wheel of the plurality of multi-wheels, wherein the at least one further motor is configured to drive the at least one multi-wheel about its respective primary axis;
   a plurality of further multi-wheels arranged along a further axis of rotation, wherein the plurality of further multi-wheels is configured to rotate freely about the further axis of rotation, wherein each further multi-wheel comprises a respective plurality of further rotatable wheel elements; and
   a controller comprising a memory and at least one processor, wherein the at least one processor is configured to execute instructions stored in the memory so as to carry out operations, the operations comprising:
   determining a desired path of the robotic vehicle;
   receiving, from the sensor, information indicative of an obstacle in the desired path of the robotic vehicle;

based on the received information, causing the at least one actuator to adjust a position of at least one rotatable wheel element relative to its respective primary axis of rotation, wherein causing the at least one actuator to adjust a position of at least one rotatable wheel element comprises causing the at least one actuator to move the at least one rotatable wheel element closer to or further from the respective primary axis; and causing the at least one motor to drive the at least one rotatable wheel element and the at least one further motor to drive the at least one multi-wheel so as to allow the robotic vehicle to circumvent the obstacle and proceed along the desired path.

12. The robotic vehicle of claim 11, wherein each of the further multi-wheels comprise each of the further rotatable wheel elements being arranged at a fixed radial position with respect to the further axis of rotation.

13. A method comprising:

determining a desired path of a robotic vehicle;

receiving, from a sensor, information indicative of an obstacle in the desired path of the robotic vehicle, wherein the sensor is coupled to the robotic vehicle;

based on the received information, causing at least one actuator to adjust a position of at least one rotatable wheel element of a multi-wheel relative to a primary axis of rotation, wherein the multi-wheel is configured to rotate about the primary axis of rotation, wherein causing the at least one actuator to adjust a position of at least one rotatable wheel element comprises causing the at least one actuator to move the at least one rotatable wheel element closer to or further from the primary axis; and causing at least one motor to drive the at least one rotatable wheel element and at least one further motor to drive the multi-wheel about the primary axis so as to allow the robotic vehicle to circumvent the obstacle and proceed along the desired path.

14. The method of claim 13, wherein the sensor comprises an inertial measurement unit (IMU) wherein the method further comprises receiving, from the IMU, information indicative of a center of gravity of the robotic vehicle, wherein causing the at least one actuator to adjust a position of the at least one rotatable wheel element is based on the received information.

15. The method of claim 13, wherein the sensor comprises an inertial measurement unit (IMU) wherein the method further comprises receiving, from the IMU, information indicative of an unbalanced condition of the robotic vehicle, wherein causing the at least one actuator to adjust a position of the at least one rotatable wheel element is based on correcting the unbalanced condition.

16. The method of claim 13, wherein the sensor comprises an image sensor, wherein the method further comprises receiving, from the image sensor, information indicative of the obstacle comprising stairs, wherein causing the at least one actuator to adjust a position of the at least one rotatable wheel element is based on at least one dimension of the stairs.

17. The method of claim 13, wherein the sensor comprises an image sensor, wherein the method further comprises receiving, from the image sensor, information indicative of the obstacle, wherein causing the at least one actuator to adjust a position of the at least one rotatable wheel element is based on the received information.

18. The method of claim 13, wherein causing the at least one actuator to adjust a position of the at least one rotatable wheel element comprises retracting the at least one rotatable wheel element such that a height of the robotic vehicle becomes smaller.

19. The method of claim 13, wherein causing the at least one actuator to adjust a position of the at least one rotatable wheel element comprises extending the at least one rotatable wheel element such that a height of the robotic vehicle becomes larger.

20. The method of claim 13, wherein causing the at least one actuator to adjust a position of the at least one rotatable wheel element comprises adjusting the at least one rotatable wheel element in an azimuthal direction with respect to the primary axis of rotation.

* * * * *